United States Patent
Bjordammen et al.

(10) Patent No.: US 9,591,363 B2
(45) Date of Patent: Mar. 7, 2017

(54) SYSTEM AND METHOD FOR OPTIMIZING STORAGE AND TRANSCODING COSTS IN NETWORK DVR

(71) Applicant: General Instrument Corporation, Horsham, PA (US)

(72) Inventors: David M Bjordammen, Blue Bell, PA (US); Thomas L Du Breuil, Ivyland, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/210,305

(22) Filed: Mar. 13, 2014

(65) Prior Publication Data

US 2014/0282762 A1    Sep. 18, 2014

Related U.S. Application Data

(63) Continuation-in-part of application No. 13/857,499, filed on Apr. 5, 2013.
(Continued)

(51) Int. Cl.
*H04N 7/173* (2011.01)
*H04N 21/466* (2011.01)
(Continued)

(52) U.S. Cl.
CPC ... *H04N 21/4667* (2013.01); *H04N 21/23113* (2013.01); *H04N 21/23439* (2013.01);
(Continued)

(58) Field of Classification Search
CPC .......... H04N 21/4667; H04N 21/2747; H04N 21/23439; H04N 21/251; H04N 21/25891;
(Continued)

(56) References Cited

U.S. PATENT DOCUMENTS 7,877,468 B2    1/2011  Abadir et al.
8,316,411 B2 *  11/2012 Weintraub ......... H04N 7/17318
                                                    725/134
(Continued)

FOREIGN PATENT DOCUMENTS

EP      1104195 A2      5/2001
JP   2009-188690 A      8/2009
(Continued)

OTHER PUBLICATIONS

PCT Search Report, Re: Application #PCT/US2014/026883; dated Aug. 13, 2014.
(Continued)

*Primary Examiner* — Nasser Goodarzi
*Assistant Examiner* — Michael B Pierorazio
(74) *Attorney, Agent, or Firm* — Lori Anne D. Swanson

(57) ABSTRACT

A method includes: storing, via a network storage device, information related to the playback history of a content playing device; receiving, via a network digital video recorder scheduler, a request to record requested content; receiving, via a network digital video recorder, the requested content in a first format and the requested content in a second format; and storing, via the network digital video recorder, only one of the requested content in the first format or the requested content in a second format based on the information related to the playback history.

18 Claims, 6 Drawing Sheets

Related U.S. Application Data

(60) Provisional application No. 61/800,954, filed on Mar. 15, 2013.

(51) Int. Cl.

| | | |
|---|---|---|
| *H04N 21/258* | (2011.01) | |
| *H04N 21/442* | (2011.01) | |
| *H04N 21/472* | (2011.01) | |
| *H04N 21/231* | (2011.01) | |
| *H04N 21/2343* | (2011.01) | |
| *H04N 21/24* | (2011.01) | |
| *H04N 21/25* | (2011.01) | |
| *H04N 21/2747* | (2011.01) | |

(52) U.S. Cl.
CPC ....... *H04N 21/2408* (2013.01); *H04N 21/251* (2013.01); *H04N 21/25825* (2013.01); *H04N 21/25833* (2013.01); *H04N 21/25891* (2013.01); *H04N 21/2747* (2013.01); *H04N 21/44204* (2013.01); *H04N 21/47202* (2013.01)

(58) Field of Classification Search
CPC ......... H04N 21/2408; H04N 21/23113; H04N 21/25825; H04N 21/25833; H04N 21/44204; H04N 21/47202
USPC .......................................................... 725/92
See application file for complete search history.

(56) References Cited

U.S. PATENT DOCUMENTS

| | | | |
|---|---|---|---|
| 8,644,678 B2 | 2/2014 | Smith et al. | |
| 8,676,036 B1 | 3/2014 | Bhogal et al. | |
| 8,843,977 B2 | 9/2014 | Ruffini et al. | |
| 9,055,333 B2* | 6/2015 | Whitten | H04N 21/4335 |
| 9,094,720 B2* | 7/2015 | Malik | H04N 5/44543 |
| 2004/0010492 A1 | 1/2004 | Zhao et al. | |
| 2005/0080497 A1 | 4/2005 | Rao | |
| 2006/0031889 A1* | 2/2006 | Bennett et al. | 725/80 |
| 2006/0083434 A1* | 4/2006 | Inata et al. | 382/232 |
| 2007/0061522 A1 | 3/2007 | Vink | |
| 2007/0157247 A1* | 7/2007 | Cordray | G06F 3/0481 725/47 |
| 2007/0157260 A1* | 7/2007 | Walker | H04N 7/163 725/86 |
| 2008/0115171 A1 | 5/2008 | Barsness et al. | |
| 2008/0235733 A1* | 9/2008 | Heie | H04N 7/163 725/46 |
| 2009/0172742 A1 | 7/2009 | Weaver | |
| 2009/0254672 A1 | 10/2009 | Zhang | |
| 2010/0231754 A1* | 9/2010 | Wang et al. | 348/231.99 |
| 2010/0277606 A1 | 11/2010 | Deluca et al. | |
| 2011/0038613 A1 | 2/2011 | Buchheit | |
| 2011/0299448 A1 | 12/2011 | Meier et al. | |
| 2012/0117103 A1 | 5/2012 | Farrelly et al. | |
| 2012/0117339 A1* | 5/2012 | Kandekar et al. | 711/159 |
| 2012/0210382 A1 | 8/2012 | Walker et al. | |
| 2012/0224834 A1 | 9/2012 | Chen et al. | |
| 2012/0265901 A1 | 10/2012 | Swenson et al. | |
| 2013/0014187 A1* | 1/2013 | Huang et al. | 725/93 |
| 2013/0129322 A1 | 5/2013 | Bhogal et al. | |
| 2013/0133009 A1 | 5/2013 | Bhogal et al. | |
| 2013/0174202 A1* | 7/2013 | Kim et al. | 725/61 |
| 2014/0013342 A1* | 1/2014 | Swan et al. | 725/5 |
| 2014/0067898 A1* | 3/2014 | Steiner | H04N 21/222 709/201 |
| 2014/0165116 A1* | 6/2014 | Major | G06F 21/6218 725/89 |
| 2014/0282787 A1 | 9/2014 | Wirick et al. | |

FOREIGN PATENT DOCUMENTS

| | | |
|---|---|---|
| WO | 2012/112910 A1 | 8/2012 |
| WO | 2013/014864 A1 | 1/2013 |

OTHER PUBLICATIONS

Wikipedia, description of Predictive Analysis, URL<http://en.wikipedia.org/wiki/Predictive_analytics>, Jan. 17, 2013.
Wikipedia, description of Predictive Analytics, URL:<http://en.wikipedia.org/wiki/Predictive_analytics>, Jan. 17, 2013.
PCT Search Report & Written Opinion, Re: Application No. PCT/US2014/021640, date. Jul. 4, 2014.
J. Baumgartner, "Comcast Tests Network DVR in Boston", Light Reading, retrieved from the Internet at <http://www.lightreading.com/document.asp?doc_id=219785&site=lr_cable>, Apr. 13, 2012.
S. Donohue, "Comcast Unveils Blueprint for Network DVR in Patent Application", Fierce Cable, retrieved from the Internet at <http://www.fiercecable.com/story/comcast-unveils-blueprint-network-dvr-patent-application/2012-08-29>, Aug. 29, 2012.

* cited by examiner

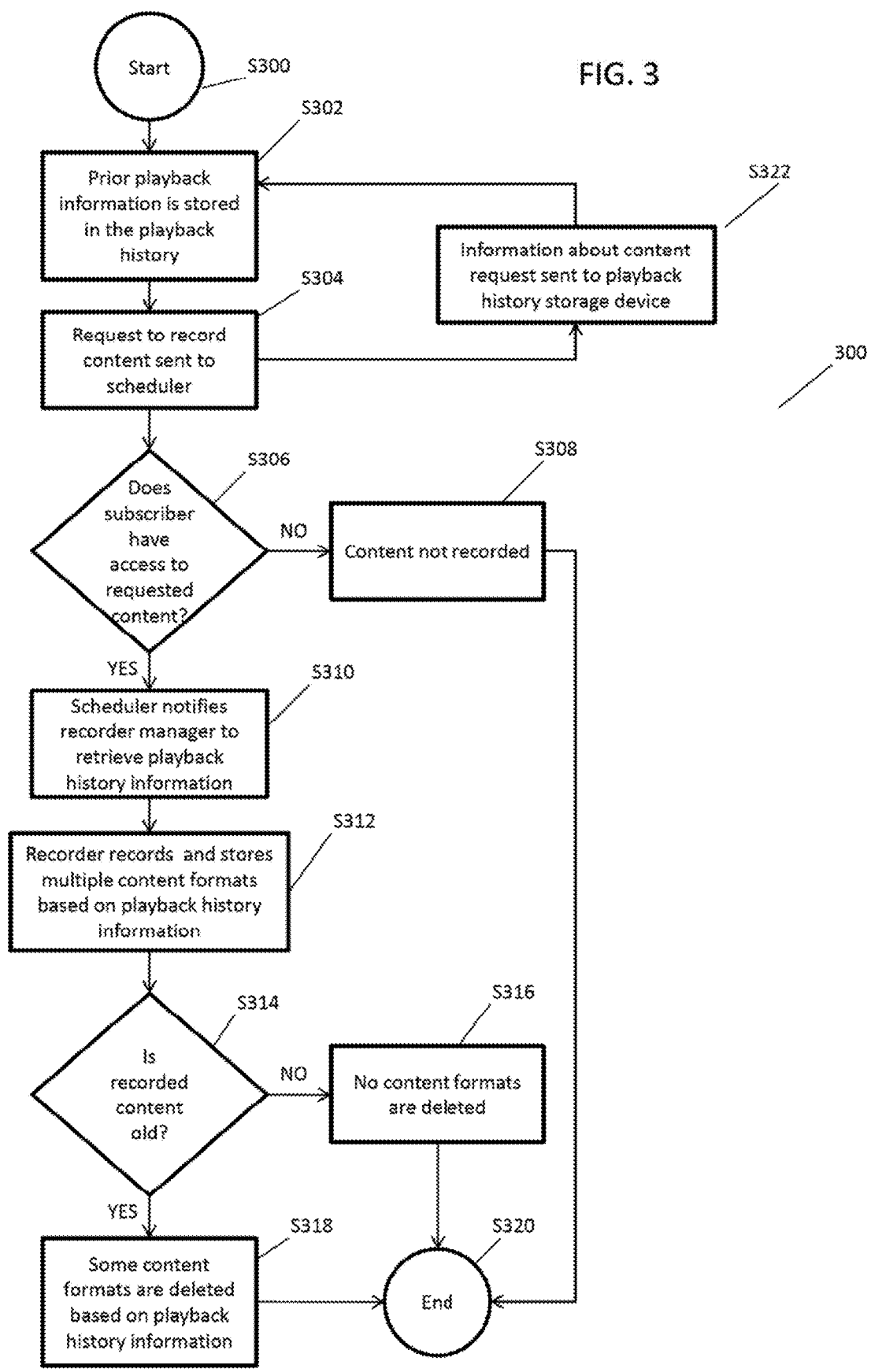

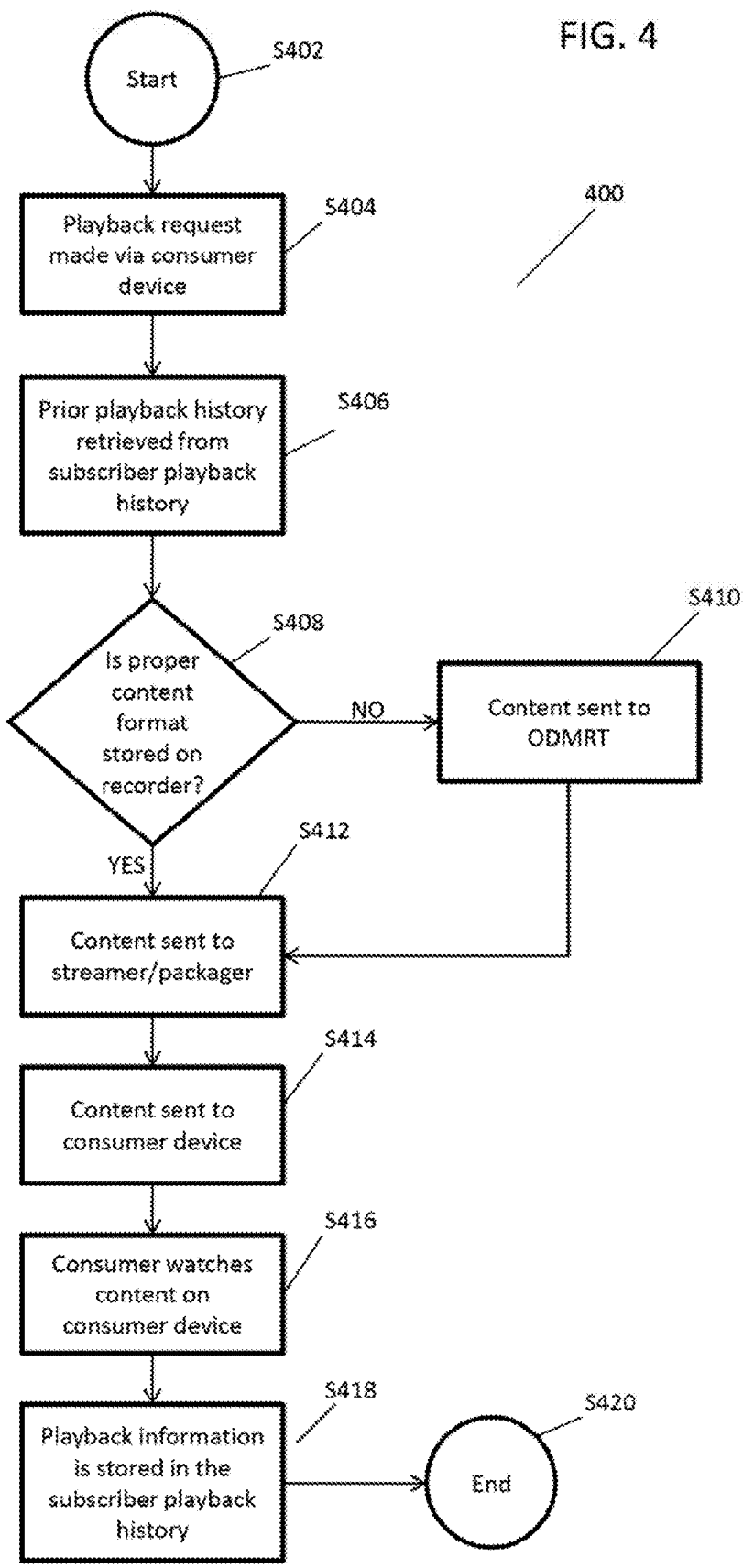

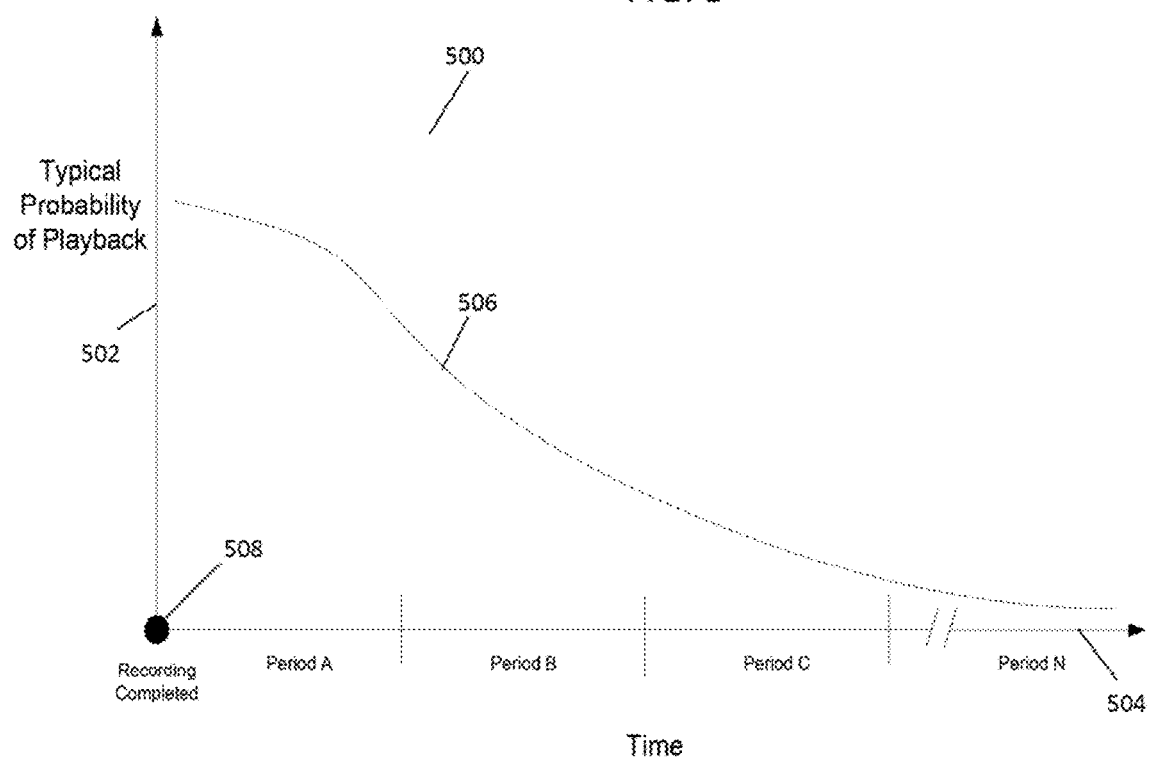

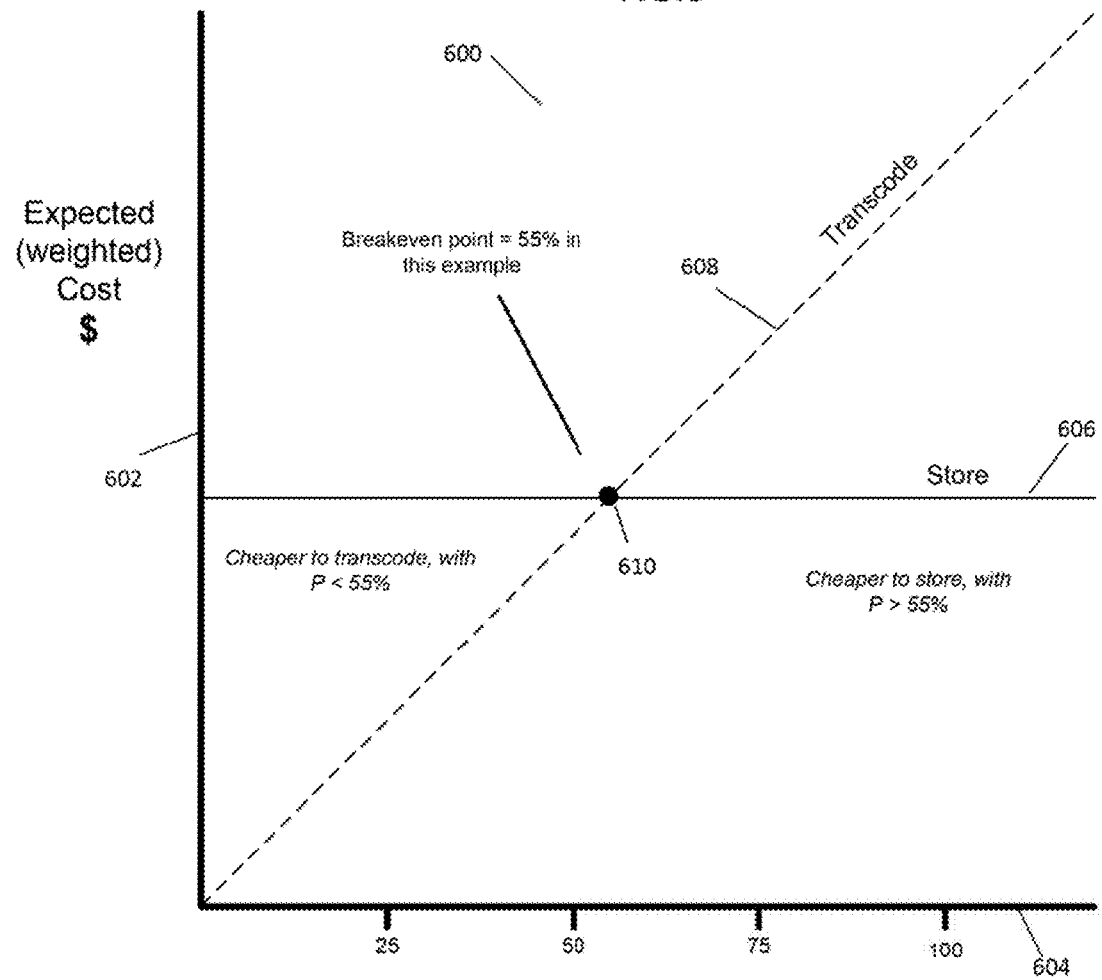

SYSTEM AND METHOD FOR OPTIMIZING STORAGE AND TRANSCODING COSTS IN NETWORK DVR

CROSS-REFERENCE

The present application claims priority from U.S. Provisional Application No. 61/800,954 entitled "System And Method For Optimizing Storage And Transcoding Costs In Network DVR" filed Mar. 15, 2013, the entire disclosure of which is incorporated herein by reference.

BACKGROUND

The present disclosure generally deals with network digital video recorders (nDVRs).

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 3 illustrates a process by which content is stored and deleted;
FIG. 4 illustrates a process by which content is played back;
FIG. 5 illustrates a chart showing a cost analysis for the determination of whether to record or transcode content;
and
FIG. 6 illustrates a chart showing the probability of watching recorded content over time.

DETAILED DESCRIPTION

Figure 1:
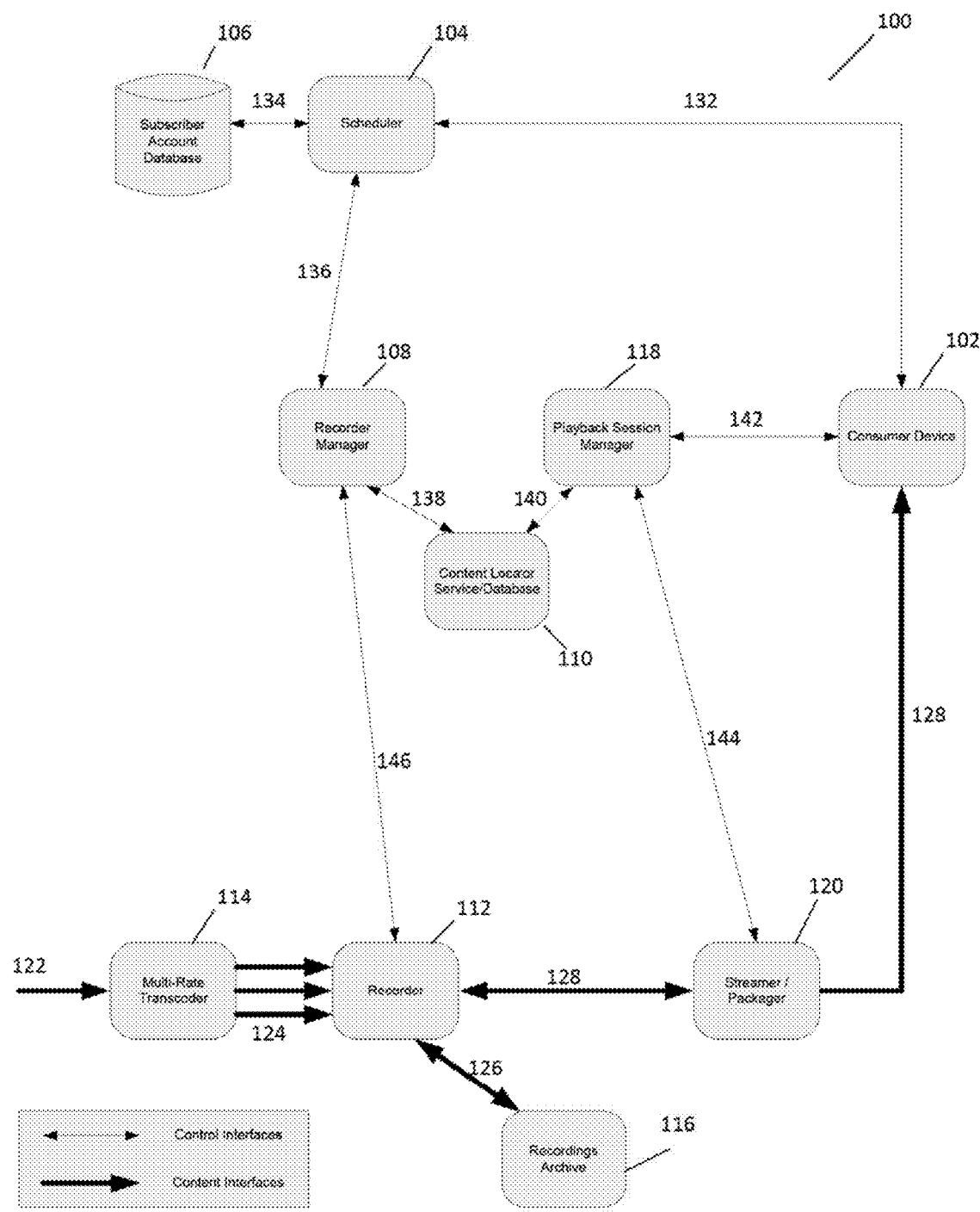
FIG. 1 illustrates a conventional nDVR system.

Embodiments of the present disclosure relate to a method for optimizing storage and transcoding costs in network based Video-On-Demand (nDVR) systems. As described in more detail below, an enhanced decision regarding whether to store variants of a content may include an evaluation of a subscriber's history, a prediction of future use, a type of device, or a type of link connection.

Many network operators are considering the deployment of a network-based DVR as an alternative to the traditional in-home DVR, e.g., a DVR that is included in a set-top-box (STB). Some of the reasons the nDVR approach is attractive to operators include: it is a more effective way to support DVR content on multiple screens, it allows legacy STBs to support DVR functions, it allows for lucrative upsale opportunities, and it enables a new platform for targeted advertising.

In some cases, the content provider is required to store each subscriber's recordings uniquely, even in the case where multiple subscribers record the same content. This requirement significantly drives up the storage costs in an nDVR deployment, to the point where those costs may exceed the costs of traditional in-home DVR. This factor is aggravated with support for multiple screens. As used herein, multiple screens means multiple formats. If all necessary formats are recorded and stored uniquely for each recording for each subscriber, the storage costs increase even more.

One way to decrease the storage costs of nDVR would be to minimize the number of formats recorded for a given asset (in the minimal case, to record only a single, high quality format). In order to support nDVR on multiple screens, however, the system would have to be able to dynamically transcode content on the fly, to convert the content into a format (i.e., screen resolution) appropriate for the display device. However, this on-demand transcoding is costly, consuming expensive processing resources on a transcoding device.

Thus there is a trade-off between storage costs and transcoding costs, and it is in the interest of network operators to find the optimal (lowest cost) balance between these costs.

One approach to the storage/transcode tradeoff is to statically configure the system in some mode, to handle all recordings in one of the following ways: record and store all possible formats, record and store only one format and transcode others as needed, or record and store a few specific formats and transcode to others as needed.

However, none of these static approaches are likely to be optimal. Because viewing habits vary by user, the best storage/transcode choice for one recording is not likely to be the best choice for another recording. In other words the one size fits all approach is certainly not optimal.

Some recordings are likely to be played back in only one format, other recordings perhaps only in another format, others may be played on all possible formats, and yet others may not be played back at all (studies show that 20% or more of all DVR recordings are never watched). Furthermore some recordings are likely to be played back within a day or two after the recording, but are then never watched again (consider, for example, a recording of a regular season baseball game). Other recordings are likely to be watched many times over a long period of time (consider the recording of a child's favorite movie). Note that these two types of recordings are likely to exist within the same subscriber account.

In general, there are multiple viewers in a household sharing the same account, and those viewers are all scheduling recordings. Furthermore, each viewer has different viewing habits, with different preferred viewing devices depending on the type of program. There exists a need to develop an process to predict which formats are the most likely to be watched, how often they will be watched and when they will be watched based on past viewing history.

FIG. 1 illustrates a conventional nDVR system 100.

As shown in the figure, system 100 comprises consumer device 102, scheduler 104, subscriber account database 106, recorder manager 108, content locator database 110, recorder 112, multi-rate transcoder 114, recordings archive 116, playback session manager 118, and streamer/packager 120.

Control interfaces are shown as thin connecting lines 132, 134, 136, 138, 140, 142, 144 and 146 and content interfaces are shown as thick connecting lines 122, 124, 126, 128 and 130. A control interface is an interface where instructions or commands are communicated, and a content interface is an interface where content is moved from one place to another.

Consumer device 102 can be any device on which content can be viewed and/or recordings scheduled (e.g., recordings may be scheduled via one consumer device on an account, and then played back on the same or different devices associated with that account). Non-limiting examples of consumer device 102 include a television, desktop computer, laptop computer, tablet computer and cellular phone. Consumer device 102 may also include a graphical user interface (GUI) that will provide the consumer to request content delivery, change settings, etc.

Scheduler 104 receives scheduling requests from consumer device 102, determines the accessibility of content and schedules content recordings.

Subscriber account database 106 stores account information of subscribers. Non-limiting examples of information stored include account number, customer name, address, subscription type, privileges, the types of devices used to view content, and specific device identities, e.g., devices may have to uniquely register to an account before they may be allowed to schedule or watch recordings for security reasons.

Recorder manager 108 receives information from scheduler 104 regarding the content to be recorded. Recorder manager 108 also relays information to recorder 112 regarding the type(s) of content and format(s) that need to be recorded for future viewing.

Content locator database 110 receives information from recorder manager 108 regarding the location of specific recorded content, information that is needed upon playback of the desired recorded content. Content locator database 110 may be in the form of a lookup table, spreadsheet, or other data storage format that would provide a mechanism by which to locate a specific content.

Recorder 112 records and stores the desired content. Recorder 112 records the content in digital format and saves it to a disk drive, USB flash drive, SD memory card or any other mass storage device designed to store large files like video content. Recorder 112 receives one or more transcoded content formats from multi-rate transcoder 114, based on the information regarding types and formats of content from recorder manager 108.

Multi-rate transcoder 114 serves to convert one type of encoded content to one or more other types of encoded content, such that the transcoded content may be viewed easily by different devices that require different video and/or audio formats (e.g., a high definition television versus a smart phone) and/or bitrates.

Recordings archive 116 is a storage device that can store older content that has not been viewed for some time. Further, in some situations, the cost associated with storing content in recordings archive 116 may be lower than the cost associated with storing content in recorder 112. Further, retrieving content from recordings archive 116 may take more time, from receipt of a content request, than retrieving content from recorder 112. Recordings archive 116 may include physical storage and/or memory media such as RAM, ROM, EEPROM, CD-ROM or other optical disk storage, magnetic disk storage or other magnetic storage devices that have the capacity to store content.

Playback session manager 118 communicates with consumer device 102 when it is time to watch a video that was previously recorded, and also with content locator database 110 to determine the location of the desired content. Playback session manager 118 knows which type of consumer device 102 is making the content request, and forwards that information along to streamer/packager 120.

Streamer/packager 120 is operable to provide content to consumer device 102 and to communicate with recorder 112 in order to assure that the content provided to consumer device 102 is provided in the appropriate format.

In operation, a consumer will determine that she wants to record a certain type of content. For this example, the content is a movie. The consumer will activate consumer device 102 and, using a user interface (not shown) on consumer device 102, inputs a request to record the movie. The request is sent, via control interface 132, to scheduler 104, which performs two functions. First, scheduler 104 checks, via control interface 134, the information contained in subscriber account database 106 to confirm that the consumer has the appropriate account and access privileges to record the desired movie. If the consumer does not have the appropriate account or access privileges, then the movie will not be recorded. If the consumer does have the appropriate account or access privileges, then scheduler 104 confirms that the movie will be recorded and sets up the recording.

The information generated by scheduler 104 is then sent, via control interface 136, to recorder manager 108. Recording manager 108 will record the content in whatever format was originally requested by consumer device 102. For example, if consumer device 102 requests the content in a standard definition format, recording manager 108 will record the content in a standard definition format. Similarly, if consumer device 102 requests the content in a high definition format, recording manager 108 will record the content in a high definition format. Recorder manager 108 knows via static configuration the 'location' on content to record, so no special lookup is required. Content locator database 110 finds where the recorded contents have been made/stored—this is because there may be actually many instances stored in recorder 112. So after the recording is configured on a specific instance of recorder 112, records manager 108 updates content locator database 110 with the location information for that particular recording. This location information in content locator database 110 is consulted upon playback, when the specific recording needs to be found.

Recorder 112 then records the appropriate content formats 124 of the movie provided by multi-rate transcoder 114, which had previously taken the highest quality content version 122 and transcoded it into content formats 124 most likely to be recorded by a consumer. It should be noted that there are typically many instances of recorder 112, which scale up as necessary to handle the ingest and recording of many assets, mostly as a function of the number of subscribers supported. After this is complete, the content is ready to be viewed by the consumer.

In order to watch the content, the consumer may request to view the movie using the user interface on consumer device 102. The request is sent to playback session manager 118, via control interface 142, and playback session manager 118 determines which instance of the recorder 112 contains the movie by communicating with content locator database 110 via control interface 140. Playback manager 118 then sends the viewing request to streamer/packager 120 via control interface 144. Streamer/packager 120 retrieves desired content format 128 from appropriate recorder 112 and streams desired content format 128 to consumer device 102 for the consumer to view.

As mentioned above, system 100 will be statically configured in some mode, to handle all recordings in one of the following ways: record and store all possible formats, record and store only one format and transcode others as needed, or record and store a few specific formats and transcode to others as needed.

Aspects in accordance with the present disclosure provide an alternative system and method managing storage/transcoding in a nDVR system. These will now be described with greater detail with reference to FIGS. 2-5.

Figure 2:
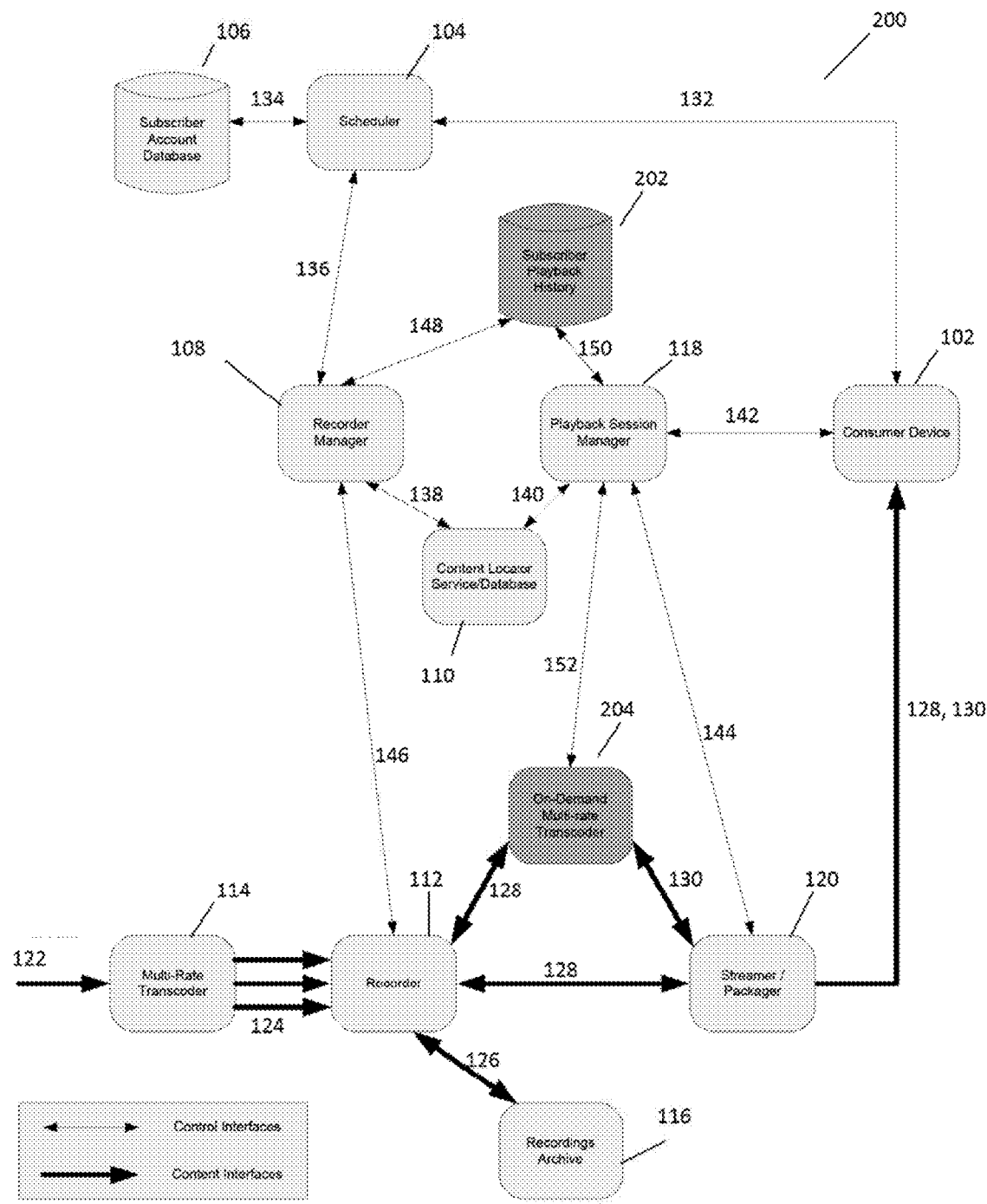
FIG. 2 illustrates another example nDVR system.

FIG. 2 illustrates another nDVR system.

As shown in the figure, nDVR system 200 may include the components of nDVR system 100 with the addition of subscriber playback history 202 and on-demand multi-rate transcoder (ODMRT) 204.

Subscriber playback history 202 is a database that stores information provided to it by playback session manager 118. Non-limiting examples of information stored on subscriber playback history 202 includes a record of playback operations for a consumer account. In some example, information may include the billing account number, playback device and capabilities, asset requested (including asset metadata such as Series Name, Genre, Episode/Title, Audience, Show Type, Parental Rating, etc.), time and date of session start, session type (i.e., VOD, nDVR, SDV), trick play usage and the type of delivery network (i.e., service provider managed, WiFi, 3G, etc.). In an example embodiment, information stored on subscriber playback history 202 includes a record of every playback operations for every consumer account. Note that the data recorded may not just be from nDVR sessions, but also VOD sessions as well as switched digital video (SDV) sessions.

Processed sessions may be captured in subscriber playback history 202 and marked accordingly. In some embodiments, all processed sessions may be captured in subscriber playback history 202 and marked accordingly. The reason VOD and SDV sessions may captured as well is to give the system a richer view into what types of content is watched, how often it is watched, and in which formats. This complete viewing history may be helpful in making predictions of future viewing of individual nDVR recordings.

ODMRT 204 is a transcoder that serves to convert one type of encoded content to one or more other types of encoded content at the point of playback, if the desired format is not stored on the recorder.

The operation of system 200 will be further described with reference to FIGS. 3-4.

FIG. 3 illustrates a method by which content is stored and deleted.

As shown in the figure, method 300 starts (S300) and any prior information regarding playback history is stored (S302) for future reference.

Returning to FIG. 2, the playback history information is stored within subscriber playback history 122.

Returning to FIG. 3, a request to record content is sent to a scheduler (S304). All information regarding the request (content type, type of device from which the request originates, etc.) is sent to a storage device (S322), where it is stored for future reference). In situations where the subscriber requesting the content does not have access to the content, then the information regarding the request will not be sent to the storage device. In particular, since the content will not be watched, such information is not relevant.

Returning to FIG. 2, consumer device 102 sends a request, via control interface 132, to record content to scheduler 104, and information relating to the request is sent to subscriber playback history 122, via control interface 148, for future reference.

Returning to FIG. 3, it may be determined if the subscriber requesting the content has access to the requested content (S306). If the subscriber does not have access to the requested content (NO at S306) then the content is not recorded (S308) and method 300 ends (S320). If the subscriber does have access to the requested content (YES at S306), then the schedule notifies the recorder manager to retrieve any available playback information (S310).

Returning to FIG. 2, scheduler 104 checks, via control interface 134, the information contained in subscriber account database 106 to confirm that the consumer has the appropriate account and access privileges to record the desired movie. If the consumer does not have the appropriate account or access privileges, then the movie will not be recorded. If the consumer does have the appropriate account or access privileges, then scheduler 104 confirms that the movie will be recorded and sets up the recording.

The information generated by scheduler 104 is then sent, via control interface 136, to recorder manager 108. Recorder manager 108 then communicates, via control interface 148, with subscriber playback history 202 to determine if the requested content, or something similar thereto, has been previously requested and/or viewed.

Returning to FIG. 3, the recorder then records and stores the requested content in different formats based on the information retrieved from the playback history information (S312).

Returning to FIG. 2, if the requested content, or something similar thereto, has not been previously requested or viewed, then recorder manager 108 may tell recorder 112, via control interface 146, to record standard format(s) based on the content being requested.

If the requested content, or something similar thereto, has been previously requested or viewed, then subscriber playback history 202 may determine which devices were used to view the similar content in past. That information would be forwarded to recorder manager 108, via control interface 148, which would then communicate with recorder 112, via control interface 146, such that recorder 112 would record the format(s) most likely to be viewed later by the consumer, thus saving storage and transcoding costs. A more detailed discussion of cost/benefit analysis of content storage versus transcoding will be described later with reference to FIG. 6.

Returning to FIG. 3, after a predetermined amount of time, the system will check the dates on which the requested content was recorded to determine if the content is old or whether it has been accessed one or more times (S314). For example, some content, like a television series, may be watched over the course of a week or two by several different family members, so it may not be desirable to use age as the only factor. If the requested content is not old (NO at S314) the no formats of the requested content are deleted (S316) and method 300 ends (S320). If the requested content is old and has not been accessed recently (YES at S316) then some content formats will be deleted based on the playback history information (S318) and method 300 ends (S320).

Returning to FIG. 2, after content 124 has been recorded, system 200 will periodically check to see if content 124 is considered "old". The user may provide a definition of "old" (for example, 5 days after recording), or system 200 may define "old" if a definition is not provided by the user. The definition of "old" may also change based on the type of content. For example, a user may only wish to keep a recorded baseball game as "new" for 2 days, but it may be desirable to keep a recorded movie as "new" for 2 months.

If content 124 is determined to be "old", then system 200 will consult subscriber playback history 202 to determine the content format that is most likely to be viewed by the user in the future. When the determination is made regarding the most likely format to be played in the future, all other formats of content 124 are deleted in order to save storage space on system 200. For example, if the requested content is a movie and the consumer typically watches movies on a tablet computer, then system 200 would delete all formats of content 124 except for the format that is best suited for viewing on a tablet computer. As another example, if the requested content is a baseball game and the consumer typically watches baseball games on an HD television, then system 200 would delete all formats of content 124 except for the HD format.

The disclosed techniques provide network operator optimization based on a knowledge of a playback history of a plurality of devices associated with an account. The network storage device stores information related to a playback history of at least one content playing device associated with an account. A network digital video recorder scheduler receives a request to record requested content. A network digital video recorder receives the requested content in a plurality of formats. A network storage device processor may compare the requested content to the playback history of the at least one content playing device associated with the account. The network storage device selects which of the plurality of formats of the requested content to store based on the comparison of the requested content to the playback history of the at least one content playing device associated with the account. The network storage device stores only the selected format(s) of the requested content.

In an example, consider a household with only set top box devices associated with the account, the playback history may indicate that only a single format is relevant, i.e., played back, in that household. Consider if another device, such as a smartphone, were added to the account. The ODMRT may transcode desired content in real-time for the smartphone since the only format stored, before this device was associated with the account, was in a format suitable for the set top. In other words, the playback history did not include a history of the smartphone prior to the addition of the smartphone to the account and, in this example, only included history related to the set top boxes. However, as the smartphone is used on the account, a playback history for the account may be updated. The next time there is a content recording request, the requested content may be compared to the updated playback history. A format for recording may be selected based on a similarity quantified between the requested content and content identified in the playback history. If the requested content is similar to content that is likely, based on the playback history, to be played back on the smartphone, the nDVR system could choose to store both the set top box and smartphone formats.

Embodiments in the nDVR system include coupling the recording subsystem with the playback subsystem. The prevailing nDVR system maintains these functions separately. The disclosed techniques include a modification to conventional nDVR systems to allow for data stored by the playback subsystem (playback history) to influence recording operations (which formats to store). The recording subsystem may consult the account specific playback history to decide which formats of a given asset to record. The playback subsystem may maintain a rich history of playback operations associated with each account. The history may include program metadata that describes the asset being played. The metadata may include program specific information, such as a title, description, genre, or the like. The history also includes the format that was played back, and the time when the playback was performed. For each new scheduled recording, the recorder manager can query the playback history database and look for similar programs. If a similar program is found, the playback history of the associated similar program is identified. The recorder manager can use this relevant history to predict the likely future playback requests for this program in one or more possible formats and likely future playback requests for similar programs in one or more possible formats. Formats that are predicted as likely will be recorded and stored in advance. Formats unlikely to be played back may not be stored (though the non-recorded format could still be available to the subscriber by using on-demand transcoding).

A cost effective mix of formats to store may be highly variable on a per account, per asset, and per device basis. Examining playback history in the manner disclosed for each account provides an enhanced manner for predicting future playback behavior and allows the recording subsystem to make decisions (e.g., to record or not to record), thereby creating a more efficient nDVR system. As described in more detail below with respect to FIG. 6, the nDVR may calculate or otherwise determine a weighted cost to transcode to a given format (based on an estimation of the probability of occurrence) and compare the weighted cost to transcode to the cost to record and store the format. Whichever cost is lower (the weighted cost to transcode vs. the cost to store) may determine the action to take (to record or not to record). The age of a recorded content may also be evaluated to determine whether to discard the recorded content. For example, stored formats that are no longer likely to be played back (based on a comparison to the playback history) may be subject to deletion. If/when the probability of a playback drops to a point that it is no longer cost effective to continue to store the format, the recorded content may be discarded.

A device may be associated with an account if it is registered with the content or service provider. In embodiments, a device is associated with an account when the device is connected to the network or communication link over which the account uses to receive content. For example, a wireless account may be associated with an account and a device may be configured to communicate over the wireless network, thereby the device associating with the account.

FIG. 4 illustrates a method by which content is played back.

As shown in the figure, method 400 starts (S402) and a request is made to play back previously recorded content (S404).

Returning to FIG. 2, consumer device 102 sends the request to play back content 124 to playback session manager 118, via control interface 142, and playback session manager 118 sends all relevant information regarding the playback request to subscriber playback history 202, via control interface 150, and to ODMRT 204 via control interface 152. For purposes of discussion, let the request for content be originated from a tablet computer.

Returning to FIG. 4, all prior playback history is retrieved from the subscriber playback history (S406).

Returning to FIG. 2, subscriber playback history 118 will provide all relevant information regarding pasts requests (including the type of device requesting the content, and the playback format of the content) for the same (or similar) to playback session manager 118 via control interface 150.

Returning to FIG. 4, it may then be determined whether the proper content for playback is stored on the recorder (S408). If the proper content is stored on the recorder (YES at S408), then the content is sent to the streamer/packager (S412) for delivery to the consumer device (S412).

Returning to FIG. 2, If the similar content requested in the past was also requested by a tablet computer, then, based on the communication between subscriber history playback 202, recorder manager 108 and recorder 112 described above, the appropriate content format for a tablet computer may be available on recorder 112. In that case, content 128 is transferred from recorder 112 to streamer/packager 120 for delivery to consumer device 102, in this case a tablet computer.

Returning to FIG. 4, the consumer watches the content on the consumer device (S416), and all information regarding the current playback session is stored in the subscriber playback history (S418), and method 400 ends (S420).

Returning to FIG. 2, after streamer/packager 120 sends content 128 to consumer device 102, the consumer watches content 128. Information regarding the current playback session is also sent to subscriber playback history 202 via control interfaces 142 and 150, in order to provide more data for future content requests.

Referring to FIG. 4, if the proper content is not stored on the recorder (NO at S408), then the content may be sent to the ODMRT for transcoding (S410) prior to sending the content to the streamer packager (S412).

Returning to FIG. 2, now consider the alternative case where the similar content requested in the past was not requested by a tablet computer, but by a HD television. In this case, recorder 112 may not have a format stored that is compatible with a tablet computer, and therefore ODMRT 204 may need to transcode the content 128 when playback is requested. The transcoded content 130 may be transferred to streamer/packager 120 for delivery to consumer device 102, the tablet computer in this case.

Returning to FIG. 4, the remaining processes of method 400 (S412-S420) are executed as described above, and method 400 ends.

Over time, as subscriber playback history 202 records more and more information regarding playback history, the decisions made regarding which formats to store versus transcode may be more accurate.

In the above examples, system 200 may automatically determines what type of content to store and transcode.

The process for determining the format(s) of content to record versus transcode will be discussed in more detail with reference to FIG. 6, but it is appropriate to first address the relationship between the probability of watching recorded content as a function of the time elapsed since recording the content, which will be discussed in further detail with reference to FIG. 5.

FIG. 5 illustrates a chart 500 showing the probability of watching recorded content over time.

As shown in the figure, chart 500 includes probability axis 502, time axis 504, origin 508 and probability curve 506. Time axis 504 may be subdivided into smaller increments of time, shown as periods A-N on chart 500. In an example embodiment, periods A-N are 3-5 day increments, however embodiments be carried out using any other designated time increments.

The probability of watching recorded content in this illustration may be a function of the age of the recording. In general, right after a recording is completed, i.e., from time t=0 at origin 508 to the end of period A, the probability of watching the recorded content is highest, and the overall probability of watching recorded content decreases over time, as shown generally by probability curve 506. For example, if a user records a baseball game but does not watch it within 2 days of recording it, it is very unlikely that the game will be watched, as other, more recent games may have been recorded for viewing. As another example, if a user records the evening news but does not watch it the next day, the likelihood of it being watched is very low, as the news will no longer be current, and evening news program will be broadcast the next evening. As yet another example, if a user records an episode of a popular sitcom and it is not watched by the time the episode is aired the next week, the likelihood of the recorded episode being watched is very low.

It should be noted that probability curve 506 depicts a typical, expected probability of playback for a particular content, and no assumptions are made based on the general probability curve 506. Instead, the probability curve for each piece of content is calculated based on the viewing history for the subscriber account, as described by the examples provided above.

It is also noted that the probability of watching a recorded content may be determined over multiple configurable periods of time (shown in FIG. 5 as Periods A, B, and C and extending indefinitely to Period N. Each period may be of a particular duration, where the duration of each period may be the same or may vary. In an example, consider that each Period A, B, and C are defined as a period between 3-5 days. One or more additional formats may be stored in the first period (Period A), but one (or more) of those formats may be deleted in a later period (e.g., Period B or C) based on the probability of playback, which is shown in FIG. 5 as decreasing over time. As described in more detail below, the cost per unit time to store an asset may be constant, but the benefit of that storage decreases over time if it becomes less likely that the asset will be played back. Thus, eventually it may be efficient to delete a given format if the ongoing storage costs exceed the weighted (expected) cost to transcode to that format. The weighted cost may take in to consideration the probability that a transcode operation will be necessary. In embodiments, transcoding is only necessary if a subscriber initiates playback requiring the format. Thus, the duration of Periods A, B, and C may be defined to smooth out playback anomalies. For example, each successive period may exhibit a lower playback probability than the prior period.

Referring back to FIG. 2, the recording operation may include application of the algorithm related to the probability of watching a recorded content. An example of the recording operation is described below.

The recorder manager 108 receives from the scheduler 104 information about a recording that needs to be performed for a particular subscriber account. Information included with this scheduling operation may include: subscriber billing account number, asset to record (including details asset metadata), set of devices and/or video formats that need to be supported (e.g., the devices [and associated video formats] linked to the subscriber' account). The recorder manager 108 may apply an algorithm to determine an optimal format(s) of the asset to record.

To facilitate the record operation, the algorithm may take into account subscriber information. For example, the recorder manager 108 searches the subscriber playback history database 202 for similar content that was viewed on the associated billing account, which formats of similar assets were viewed and how often.

Based on the subscriber's playback history for similar content viewed on the associated billing account, the recorder manager 108 may determine the probability that the asset to be recorded will be played in all the required formats during Period A. In other words, following a trend of the subscriber's history in playback, a similar trend is assumed for similar content and a same probability of playback is applied to determine whether to record and the optimal format(s) of the asset to record.

Based on the probability of playback, and the cost to transcode metrics, the recorder manager 108 may calculate a weighted cost to transcode the asset for each required asset. As described in more detail below with respect to FIG. 6, the costs to transcode can be compared to the cost to record and store the asset. In embodiments, for a given format, for example, the weighted cost to transcode the asset is less than the cost to record/store the asset, then that format will not be recorded. However, in embodiments in which the weighted cost to transcode is greater, then that format of the asset may be recorded.

The recorder manager 108 stores in the content locator service database 110 a record for each format recorded for each asset. This allows the playback session manager 118 to find the appropriate asset and format required to service a particular playback request. If a playback request requires a particular format that was not recorded (i.e., the asset in the requested format does not exist in the recorder 112), then the playback session manager 118 can orchestrate a transcoding operation. For example, the playback session manager 118 facilitates a conversion of a 'master' format of the asset (often called the 'Mezzanine' format of the asset) into the required format, using the ODMRT 204.

Periodically the recorder manager 108 may evaluate existing recordings to determine whether or not the individually stored formats should be maintained or deleted, based on expected future viewing probabilities. In other words, the recorder manager 108 may calculate the weighted transcoding costs for each format based on the probability of viewing in the future time periods. If at any point the probability for viewing drops to the point where the weighted cost to transcode becomes less than the cost to store, at that point the copy of that format of the asset may be deleted from storage.

FIG. 6 illustrates a chart showing a cost analysis for the determination of whether to record or transcode content.

As shown in the figure, chart 600 includes expected (weighted) cost axis 602, playback probability axis 604, storage cost line 606, transcode cost line 608 and breakeven point 610.

In general, the cost to store a piece of content remains constant regardless of the probability of playback, noted by the flat storage cost line 606. In general, the cost to transcode a piece of content is higher than it is to store that same piece of content. Therefore, as the probability of playback increases, it is much more cost effective to have the content stored instead of transcoding it. This is shown generally by the upward sloped transcode cost line 608. The point at which storage cost line 606 and transcode cost line 608 intersect is breakeven point 610. At breakeven point 610, the cost to transcode and the cost to store are equal. In the example shown in chart 600, the breakeven point occurs when the probability of playback is 55%. As discussed above, this means that when the probability of viewing the content is less than 55%, the desired content format should not be stored in recorder 112, but transcoded when the playback request is received. Conversely, when the probability of viewing the content is greater than 55%, the desired content format should be stored in recorder 112 in order to reduce costs. When the probability of viewing the content is exactly 55%, then the content may either be stored in the desired format or not stored, as the cost for either option is the same.

The breakeven point may be different for different types of content, so each piece of content may have a unique expected cost vs. playback probability chart. The following example details a scenario in which decisions are made to transcode and/or record content.

Note that the transcode line in FIG. 6 goes past 100% probability. Such embodiment accounts for a case where playback is highly probable to the extent that more than one playback session of the asset is fairly likely (as part of more than one playback session). Such embodiment also assumes that nDVR content is not cached past the end of a given playback session. Thus each subsequent playback session of the same asset/format would require additional transcoding resources. If an initial decision is to not store a given format at initial record time, there may not be a reason to incur the cost for storing a real time transcoded copy. However, FIG. 6 depicts the fact that probability of playback can be greater than 100%, since each separate playback session consumes its own transcoding resources. Whether the probability is 90% or 110%, for any probability over the breakeven point, the choice will be to store.

In a first example, consider a subscriber account having the following devices:

a HD device that is compatible with H.264, known as the mezzanine format; a standard definition device that is compatible with MPEG-2, known as format X; a tablet device that may use an adaptive bit rate and is compatible with H.264, 720×480 resolution, 2000 Kbps, known as format Y; and a smartphone that may use an adaptive bit rate and is compatible with H.264, 360×240 resolution, 440 Kbps, known as format Z.

In this example, the mezzanine format (H.264) is the highest quality format. For purposes of discussion, let this format always be recorded be used to transcode all other formats as necessary. Further, let there are three different time periods: Period A (0-2 days after recording); Period B (2-6 days after recording); and Period C (6-10 days after recording).

The following table outlines some assumed costs:

|  | Format X | Format Y | Format Z |
| --- | --- | --- | --- |
| Cost to record 1 hour and store for period A | Store$_{X-A}$ = $1.00 | Store$_{Y-A}$ = $0.80 | Store$_{Z-A}$ = $0.50 |
| Cost to transcode 1 hour | Trans$_X$ = $2.00 | Trans$_Y$ = $2.50 | Trans$_Z$ = $3.00 |
| Cost to store 1 hour for period B | Store$_{X-B}$ = 41.20 | Store$_{Y-B}$ = $1.00 | Store$_{Z-B}$ = $0.70 |
| Cost to store 1 hour for period C | Store$_{X-C}$ = $1.20 | Store$_{Y-C}$ = $1.00 | Store$_{Z-C}$ = $0.70 |

As disclosed, many parameters may be considered to determine a probability that a content will be recorded and/or transcoded. A format may refer to a collection of parameters that describe the video/audio of the asset. Three formats, Format X, Format Y, and Format Z are described above, but it should be understood that more than three formats may be supported by the system. Non-limiting examples of parameters that may be included in the collection of parameters that make up a format may include a video codec (e.g., MPEG-2 or H.264), a video frame rate (e.g., 15 or 29.97), video resolution (e.g., 360×240, 480× 320, 720×480), and a video bit rate (e.g., 200 Kbps, 600 Kbps, 2000 Kbps).

The parameters that define a format may include global, static, and/or mostly static parameters. For example, global parameters may apply to all assets and accounts. The global parameters may tend to be mostly static because they may change infrequently when the system is tuned or when the cost dynamics change (e.g., if hard drive costs drop significantly). Thus, global and mostly static parameters may be held statically in the recorder manager 108 and not vary on a per account basis.

As described above, there are variations per format type, such as the cost to store a given format and the cost to transcode to a given format. In embodiments, the costs are separated so that different formats are more compact than others, enabling certain assets of the same duration to be stored with less cost. Thus, in embodiments, the costs to store and transcode each format are captured separately.

Other parameters that may be considered are asset and account specific parameters. Asset and account specific parameters may derived by examining a viewing history of similar assets on the specific device in question. The recorder manager 108 examines the data in the subscriber playback history database, looking for similar assets (e.g., same genre, series, target audience, similar title, etc). The recorder manager 108 may use the available data to determine when and where the similar assets were viewed. Based on how similar the assets are and how many of the similar assets were found, the recorder manager may assign a "similarity weighting factor." The higher the similarity weighting factor, the more similar the asset. The recorder manager 108 may also look at the average of all assets watched on that specific account to make up the balance of non-similarity. For example, for assets that are not very similar to those in the device's history, the average of all assets viewed on the account may be considered instead.

In embodiments, only the viewing stats during a first period, e.g., Period A, are considered when making an initial decision whether to store an asset in a given format. The viewing habits for later periods, e.g., Period B or Period C, may only be consulted upon a later determination whether to delete a format that has been stored. For example, an asset stored for a period of time may be discarded if it is unlikely that the subscriber will request to view that format again.

For purposes of example, assume a recording is scheduled: a regular season baseball game. Prior to the start of the event, the recorder manager 108 queries the viewing history for the associated account looking for similar playback operations. Based on this query, the RM finds many similar events, many other baseball games with at least one similar team that have been recorded and viewed on this account. This match is found by checking the associated program metadata (Episode Title, Show Type, etc.) for operations played back on this account.

The main initial job of the recorder manager may be to decide which formats to record. To determine this, the recorder manager may only be concerned with the probability of playback during the first time period (Period A). The probability of playback during later time periods may be used to determine if and when already stored formats are deleted.

In an example, let the following playback percentages for period A be as follows: Percentage of all recordings played back in format X within period A: $P_{All-X-A}$=50%; Percentage of similar recordings played back in format X within period A: $P_{Sim-X-A}$=10%; Percentage of all recordings played back in format Y within period A: $P_{All-Y-A}$=15%; Percentage of similar recordings played back in format Y within period A: $P_{Sim-Y-A}$=55%; Percentage of all recordings played back in format Z within period A: $P_{All-Z-A}$=10%; Percentage of similar recordings played back in format Z within period A: $P_{Sim-Z-A}$=15%; and Similarity weighting factor (% confidence factor—how closely does the recording in question match the similar recordings from account history): Sim-Factor=90%.

Based on the data above, it is clear that there are many similar playback operations on this account (the Sim-Factor is a high 90%). The history indicates that similar recordings are played back frequently on the Tablet (Format Y), but not so frequently on the standard definition device (Format X) nor on the smartphone (Format Z).

To determine the relative cost of storing versus transcoding for format X (MPEG-2), the following comparison is made: relative cost to record and store:

$Store_{X-A}$=$1.00;

Relative weighted cost to transcode: (Sim-Factor*$P_{Sim-X-A}$+[1-Sim-Factor]*$P_{All-X-A}$)
*$Trans_X$=(0.90*$0.10)+($0.10*$0.50)
*$2.00=$0.28.

The weighted cost to transcode to Format X is less than the cost to store. The reason this is that case is that similar programs are rarely played back in this format. So it does not make sense to record this format up front, instead to transcode to this format only if requested (which is unlikely).

To determine the relative cost of storing versus transcoding for format Y (ABR for tablet), the following comparison is made: relative cost to record and store:

$Store_{Y-A}$=$0.80;

Relative weighted cost to transcode: (Sim-Factor*$P_{Sim-Y-A}$+[1-Sim-Factor]*$P_{All-Y-A}$)
*$Trans_Y$=(0.90*$0.55)+($0.10*$0.15)
*$2.50=$1.27.

The weighted cost to transcode to Format Y is more than the cost to record and store. The reason this is that case is that similar programs are frequently played back on the tablet. Thus a playback request for tablet is likely for this program too, and it is thus cheaper to record and store this format up front (thereby avoiding a likely and costly transcoding operation in the future).

To determine the relative cost of storing versus transcoding for format Z (ABR for smartphone), the following comparison is made: relative cost to record and store:

$Store_{Z-A}$=$0.50;

Relative weighted cost to transcode: (Sim-Factor*$P_{Sim-Z-A}$+[1-Sim-Factor]*$P_{All-Z-A}$)
*$Trans_Z$=(0.90*$0.15)+($0.10*$0.10)
*$3.00=$0.44

The weighted cost to transcode to Format Z is less than the cost to store. The reason this is that case is that similar programs are rarely played back in this format (for Smart Phone). So it does not make sense to record this format up front, instead to transcode to this format only if requested, which is unlikely to happen.

Within this example, it may also necessary to determine if and when to delete a given format once the content has been stored past time period A. Based on the above calculations, the recorder manager decides to record two formats for this asset: the mezzanine format (H.264 High Def) and format Y (ABR for the tablet). With respect to this recording the recorder manager may periodically check the viewing history of similar assets on this account to determine how long it makes sense to store format Y. There is an ongoing cost to store this media file, but the value of holding that file decreases over time as the likelihood the user may request playback decreases.

Formats X and Z are irrelevant at this point since they were not recorded and stored, thus there is no consideration to whether or not those formats should be deleted.

The relevant data for the decision for format Y in period B may determined from viewing history on the account. For purposes of discussion, in this example, let the relevant data be as follows:

Percentage of all recordings played back in format Y in period B: $P_{All-Y-B}$=10%;
Percentage of similar recordings played back in format Y in period B: $P_{Sim-Y-B}$=5%;

Similarity weighting factor (% confidence factor—how closely does the recording in question match the similar recordings from account history): Sim-Factor=90%.

It is noted that cost parameters may be effectively relative costs used to compare costs to store versus transcode a given asset. In other words, absolute costs may not be necessary, as the relative costs are sufficient for comparison. The cost metrics may be defined in units to transcode and store a particular duration of content in a given format. Since the relative costs are suitable, and since the costs to store and transcode both scale linearly with the time length of the asset, the length of the asset in the relative calculations may not be necessary.

For purposes of discussion, in this example, to determine the relative cost of storing versus transcoding for format Y in period B, the following comparison is made: relative cost to record and store:

Store$y_{Y-B}$: $1.00;

Relative weighted cost to transcode: (Sim-Factor*$P_{Sim-Y-B}$+[1-Sim-Factor]*$P_{All-Y-B}$)
*$Trans_Y$=(0.90*$0.05)+($0.10*$0.10)
*$2.50=$0.14

Since the relative weighted cost to transcode ($0.14) is less than the relative cost to store ($1.00), then format Y should be deleted at the start of Period B (i.e., at the end of Period A).

Naturally, since the event is deleted in period B, there is no need to check the data for period C. The recorder manager would not attempt to determine the period C data in this example, since that would be unnecessary work, e.g., the period C data is not relevant.

In the above example, the mezzanine format stored was the format of the highest quality. However, there may be instances where the mezzanine format may not need to be the highest quality. For example, if historical usage of viewing patterns shows that content is only viewed on a limited resolution device, then the mezzanine format may only need to be a lower resolution format, like SD instead of HD, which would result in significant cost savings.

It is noted that in embodiments, all session playback operations, e.g., VOD, SDV, nDVR, may be captured. All of the session playback operations may likewise by considered when predicting future nDVR playback requests. The VOD and SDV session histories may be used as a second order factor, in the absence of many similar nDVR operations, as a way to characterize what type content is typically watched on what device. For simplicity the example above does not take into consideration the VOD and SDV history, since the example assumes a fairly rich set of nDVR playback history, which is a better predictor of future nDVR playback behavior than the VOD or SDV activity.

Another feature of the algorithm is the configurability of key parameters, allowing the operator to customize and optimize performance based on observed viewing patterns. Also, the algorithm allows for configurable record/storage and transcode metrics to allow the system to evolve appropriately over time, as storage costs and transcoding costs change. In other words, if over time the storage costs decrease more rapidly than transcoding costs (or vice versa), then the algorithm is able to take these changes into consideration since these parameters are tunable.

Lots of content carried on HD services is actually upconverted SD, often with pillar bars. If programmer metadata were to convey this information to the nDVR system, or the nDVR were sophisticated enough to automatically detect it, the nDVR could choose to save storage bandwidth and improve the subsequent subscriber experience on non-TV devices by converting it back to its native format, e.g., extract the 4:3 SD content out of the HD broadcast and transcode it back to a true 480i or p, saving this to disc. Alternatively, the nDVR could automatically redirect to recording the SD version of the program automatically if it is available. The file size would be smaller, and when such content is delivered (may include an additional transcode to yet a smaller resolution or different codec) to non-TV devices, the target device can then decide how to present the content optimally, including allowing user selection. When delivered to TVs, this modified content should look as good as the original, assuming a high quality transcoder, and the TV will inherently know its aspect ratio and display characteristics.

The addition of metadata from the content sources or other 3rd party metadata providers to add to the capability of the heuristics used to make recording decisions for the financial benefit of the service provider while maximizing the user experience. Such metadata may provide advanced knowledge of an actual content format, available languages/soundtracks, or the like, that could be added to the heuristics.

If the history on a particular program reveal that it is only ever played on a tablet, then the nDVR should go the other direction such that when the same user requests the same program in HD, the nDVR system looks to see if there is an SD version available at the same time, and record that instead. In this scenario, where the historical usage is only on a limited resolution/quality device, this enhancement to the algorithm can result in significant cost savings by only storing the SD version of the content as the "mezzanine" format, and transcoded versions of this, if needed, would also be lower cost since SD transcoding has lower complexity (far fewer pixels to manipulate).

It may be desirable to enable a subscriber user interface preference adjustment for the disclosed techniques. For example, an operator may offer different option levels and/or disk space based on a subscription level, such as:

a. Basic—system auto-decides, some small number of user overrides allowed.
b. Enhanced—for $x/month, always store both HD and iPad 4-optimized for WiFi in-home consumption.
c. Gold—for $2x/month, always store versions optimized for all my devices and keep every requested recording available for at least 2 weeks.

While a default may be that the system automatically decide recording preferences based on the criteria disclosed above, in embodiments a user could review the algorithm decisions for currently recorded and/or scheduled recordings and manually update them.

In embodiments, a history capture not only includes the characteristics of the device(s) that requested playback of the content, but also the characteristics of the delivery network used to fulfill the playback request. For example, the system may determine if content was delivered over a high bandwidth, low latency connection, WiFi, 4G, 3G, or other quality/bitrate. Consider an example of a rail commuter recording an 11 pm news program every night. The rail commuter consumes the new program during their morning commute on their 3.5" smartphone on a train where they have a moderate 3G delivery network. In this example, the nDVR system may not be capable to determine the actual network type or characteristics unless the nDVR playback client on the requesting device specifically reports it. However, the nDVR system can reliably infer the required knowledge based on whether it was processed through the streamer (directly to a set top over the provider-managed network) or packager where it is delivered as an Adaptive Bit Rate stream. Then, the heuristics of the network can be determined directly from the HTTP requests being made by the nDVR playback client. Such embodiments would include collecting data by the HLS server delivering this content (represented by the Packager in FIG. 1) and reporting it into the playback history.

By collecting the history as disclosed herein, the system may effectively learn the capabilities of all the playback device types that are used for content playback. Today, many mobile phones are extremely limited in their resolution and video processing power. By gathering this data over time, the system can tune future recording decisions for both the current user and new users that show up on the nDVR system with the same type of device, e.g., an iPhone 1 vs. an iPhone 5 vs. a Droid Razr Max HD, to preferentially record/store the version(s) most appropriate for that device type, in addition to the mezzanine version. Thus, the nDVR system may not only optimize the storage and transcoding costs for the service provider, but could also be used to identify stream compatibility issues with certain devices, of which many exist. Further, the service provider could use their nDVR transcoder/recorder/packager vendor to tweak the transcoding/recording/playing process to overcome the specific compatibility issue for each such device that appears on the network. Tweaking the process may improve customer satisfaction while not breaking stream performance for other users. This enhancement may include sending a device model identifier to the transcoder/recorder/packager modules for adjusting parameters to accommodate the device.

Note that using a device database that identifies device characteristics can be built either automatically or manually. For example, an automatic build may occur when one or more users start using a new device. A manual build may be performed by the nDVR vendor and/or service provider, e.g., when a manufacturer ships a device, the vendor and/or service provider could buy one, characterize the device, and add the device data to the nDVR system device database directly.

In current nDVR systems, in order to assure the appropriate content format will be available, it may be necessary to store many different content formats (for the same piece of content) for potential future playback. Storing many different content formats can become very expensive, especially if the consumer typically watches content in only a select number of formats based on the devices used.

The present disclosure provides methods to reduce costs associated with content storage on nDVR systems by storing data related to past content recording and viewing preferences, and using that data to predict which content formats are most likely to be viewed on a particular device. Using this information, it is possible to store only a limited number of content formats, thus reducing costs associated with content storage. In addition, if a content format is requested that is atypical for the user, an on-demand multi-rate transcoder can by employed to transcode the content to the appropriate format at the time of playback.

Another aspect of the present disclosure provides methods to further reduce costs associated with content storage by analyzing older content that is stored on the system, and deleting all forms of the content available except for the one(s) most likely to be viewed by the user in the future.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

We claim:

1. A method for storing selected formats of a requested content in a network digital video recorder system having a network storage device, network digital video recorder scheduler, and a network digital video recorder, the network digital video recorder system for storing unique copies of the requested content for requesting accounts, each copy in at least one format selected for the respective requesting account, the method comprising:
    storing, via the network storage device, information related to a playback history for each of a plurality of accounts, wherein each account is associated with at least one content playing device;
    receiving, via the network digital video recorder scheduler, a request to record requested content;
    receiving the requested content in a plurality of formats, wherein the network digital video recorder system couples the network storage device with the network digital video recorder to base a determination of which of the one or more of the received plurality of formats to store the requested content for each account on the playback history stored for each account;
    determining, for each account, which of the one or more plurality of formats to store by:
        comparing the requested content to the playback history of the at least one content playing device associated with the respective account;
        selecting which of the received plurality of formats of the requested content to store for the respective account based on the comparison of the requested content to the playback history of the at least one content playing device associated with the account; and
        storing uniquely for the respective account the requested content in the format(s) selected within the received plurality of formats, discarding for that respective account any unselected formats of the requested content.

2. The method of claim 1, further comprising:
    determining a period of time after which a probability of playback of the requested content in the selected format is unlikely; and
    discarding a stored format of the requested content after the period of time has lapsed.

3. The method of claim 2, wherein a probability of playback of a recorded content may be determined over multiple configurable periods of time, and the discard of the stored format is discarded in one of the multiple configurable periods of time.

4. The method of claim 1, wherein a playback history for no more than a first period of time is used for the comparison to the requested content to make an initial decision whether to store the requested content in at least one of the plurality of formats.

5. The method of claim 1, further comprising evaluating existing recordings stored to determine whether the uniquely stored formats should be maintained or deleted based on expected future viewing probabilities.

6. The method of claim 1, further comprising updating the playback history associated with the account when an additional content playing device is added to the account.

7. The method of claim 1, further comprising on-demand transcoding a requested content for a requesting content playing device where the requested content in the requested format is not stored for the account.

8. The method of claim 1, further comprising:
comparing an on-demand transcoding cost to a storage cost, and
storing the requested content in at least one of the plurality of formats if the on-demand transcoding cost to transcode the recorded content in the at least one of the plurality of formats is greater than the cost to store the requested content in the at least one of the plurality of formats.

9. The method of claim 1, wherein storing information related to a playback history of a content device comprises storing an array of program playback metadata.

10. The method of claim 1, wherein comparing the requested content to the playback history of the content playback history comprises quantifying a match between similar prior playback operations and the requested content.

11. The method of claim 1, wherein the playback metadata includes a title of a content, a description of the content, a genre of the content.

12. The method of claim 1, wherein the playback history includes information related to at least one of a content playing device capabilities, previous content requested, a time or date of session start, or a trick play usage.

13. The method of claim 1, wherein no more than a single format in the plurality of formats is selected for storage of the requested content.

14. The method of claim 13, wherein the single format selected is the highest available format.

15. The method of claim 1, further comprising storing the requested content in a first format, storing the requested content in a second format, and subsequently deleting the content in one of the first format or the second format after a predetermined period of time.

16. The method of claim 1, wherein a device is associated with an account if the content playing device is registered with the content provider.

17. The method of claim 1, wherein the playback history includes characteristics of a delivery network used to fulfill the playback request.

18. A network digital video recorder system for storing unique copies of requested content for selected formats of a requested content for requesting accounts, each copy in at least one format selected for the respective requesting account, the network digital video recorder system comprising:
a storage component for storing information related to a playback history of a plurality of accounts, wherein each account is associated with at least one content playing device;
a network digital video recorder scheduler for receiving a request to record requested content;
a network digital video recorder for receiving the requested content in a plurality of formats, wherein the network digital video recorder system couples the storage component with the network digital video recorder to couple the stored playback history for each account with a determination of which of the one or more of the received plurality of formats to store the requested content for each account; and
a processor for determining, for each account, which of the one or more plurality of formats to store by:
comparing the requested content to the playback history of the at least one content playing device associated with the account;
selecting which of the plurality of formats of the requested content to store based on the comparison of the requested content to the playback history of the at least one content playing device associated with the account; and
storing uniquely for the respective account the requested content in the selected format(s), discarding for that respective account any unselected formats of the requested content.

* * * * *